United States Patent
Deshpande et al.

(10) Patent No.: US 10,876,867 B2
(45) Date of Patent: Dec. 29, 2020

(54) FAULT DETECTION SYSTEM UTILIZING DYNAMIC PRINCIPAL COMPONENTS ANALYSIS

(71) Applicants: Chevron U.S.A. Inc., San Ramon, CA (US); University of Southern California, Los Angeles, CA (US)

(72) Inventors: Alisha Deshpande, Houston, TX (US); Si-Zhao J. Qin, Los Angeles, CA (US); Lisa Ann Brenskelle, Houston, TX (US)

(73) Assignees: Chevron U.S.A. Inc., San Ramon, CA (US); University of Southern California, Los Angeles, CA (US)

( * ) Notice: Subject to any disclaimer, the term of this patent is extended or adjusted under 35 U.S.C. 154(b) by 151 days.

(21) Appl. No.: 15/811,477

(22) Filed: Nov. 13, 2017

(65) Prior Publication Data

US 2018/0136019 A1 May 17, 2018

Related U.S. Application Data

(60) Provisional application No. 62/421,080, filed on Nov. 11, 2016.

(51) Int. Cl.
 *G01D 3/08* (2006.01)
 *G01D 18/00* (2006.01)
 (Continued)

(52) U.S. Cl.
 CPC .............. *G01D 18/002* (2013.01); *G01D 3/08* (2013.01); *G06F 17/16* (2013.01); *G06F 17/18* (2013.01);
 (Continued)

(58) Field of Classification Search
 CPC ........ G01D 18/002; G01D 3/08; G06F 17/16; G06F 17/18; G06K 9/6247; G06K 9/00523
 See application file for complete search history.

(56) References Cited

U.S. PATENT DOCUMENTS

| 6,594,620 B1 | 7/2003 | Qin et al. |
| 2006/0095232 A1 | 5/2006 | Purdy |

(Continued)

OTHER PUBLICATIONS

Li et al., Dynamic Latent Variable Modeling for Statistical Process Monitoring, Aug. 28-Sep. 2, 2011, 18th International Federation of Automatic Control (IFAC) World Congress, Milano, Italy, pp. 12886-12891 (Year: 2011).*

(Continued)

*Primary Examiner* — Toan M Le
(74) *Attorney, Agent, or Firm* — William N. Hughet; Melissa M. Hayworth; Jason M. Guerrero

(57) ABSTRACT

Methods and systems for detecting a fault in a data set from an industrial process are disclosed. One method includes forming a first data matrix at a data processing framework from time-series training data, and performing a principal component pursuit on the first data matrix to form an uncorrupted, unscaled matrix and a sparse matrix in the memory, and scaling the uncorrupted, unscaled matrix to form an uncorrupted scaled matrix. The method also includes performing a dynamic principal component analysis (DPCA) on the uncorrupted scaled matrix to form a DPCA model, and determining a squared prediction error from the DPCA model. Based on the squared prediction error, faults are detected in a different data set from operation of the industrial process. At least one of (1) correcting the one or more faults in the different data set or (2) performing a repair operation on a sensor is performed.

24 Claims, 15 Drawing Sheets

(51) Int. Cl.
    G06F 17/18    (2006.01)
    G06F 17/16    (2006.01)
    G06K 9/00     (2006.01)
    G06K 9/62     (2006.01)
(52) U.S. Cl.
    CPC ....... *G06K 9/00523* (2013.01); *G06K 9/6247* (2013.01)

(56) References Cited

U.S. PATENT DOCUMENTS

| | | |
|---|---|---|
| 2009/0190850 A1 | 7/2009 | Tang |
| 2011/0320166 A1 | 12/2011 | Luo et al. |
| 2014/0108359 A1 | 4/2014 | Banaei-Kashani et al. |
| 2016/0179599 A1 | 6/2016 | Deshpande et al. |

OTHER PUBLICATIONS

Shen et al., Failure Detection, Isolation, and Recovery of Multi-functional Self-Validating Sensors, Dec. 2012, IEEE Transactions on Instrumentation and Measurement, vol. 61, No. 12, pp. 3351-3362 (Year: 2012).*

OSIsoft PI Coresight Data Infrastructure System information presented at LATAM Regional Conference, Sao Paulo, Brazil Jun. 7-8, 2016, pp. 1-7.

Raman, Vijayshankar and J.M. Hellerstein, "Potter's Wheel: An Interactive Data Cleaning System", Proceedings of the 27th VLDB Conference, Roma, Italy (2001)10 pages.

Rahm, E., et al., "Data Cleaning: Problems and Current Approaches", Bulletin of the Technical Committee on Data Engineering, IEEE Computer Society, (2000) 23(4):1-15.

Yue, H. Henry and S. Joe Qin, "Reconstruction-Based Fault Identification Using a Combined Index", Ind. Eng. Chem. Res. (2001) 40:4403-4414.

Galhardas, Helena, et al., "Declarative Data Cleaning: Laungauge, Model, and Algorithms", Proceedings of the 27th VLDB Conference, Roma, Italy (2001)10 pages.

Dunia, Ricardo and S. Joe Qin, "Subspace Approach to Multidimensional Fault Identification and Reconstruction", AIChE Journal (1998) 44(8):1813-1831.

Buonadonna, P., et al., "TASK: Sensor Network in a Box", IEEE 0-7803-8801(2005) pp. 133-144.

Lee, Changkyu, et al., "Sensor fault identification based on time-lagged PCA in dynamic processes", Chemometrics and Intelligent Laboratory Systems (2004) 70:65-178.

Ku, Wenfu, et al., "Disturbance detection and isolation by dynamic prinicpal component analysis", Chemometrics and Intelligent Laboratory Systems (1995) 30:179-196.

Nomikos, Paul and John F. MacGregor, "Multivariate SPC Charts for Monitoring Batch Processes", Technometrics (1995) 37(1):41-59.

Low, L.W., et al., "A knowledge-based approach for duplicate elimination in data cleaning", Information Systems (2001) 26:585-606.

Banaei-Kahani, F. et al., "SDFP: A Framework for Online, Real-time Cleansing of Upstream Operating Data", Apr. 2013.

* cited by examiner

FAULT DETECTION SYSTEM UTILIZING DYNAMIC PRINCIPAL COMPONENTS ANALYSIS

CROSS-REFERENCE TO RELATED APPLICATIONS

The present application claims priority from U.S. Provisional Patent Application No. 62/421,080, filed on Nov. 11, 2016, the disclosure of which is hereby incorporated by reference in its entirety.

BACKGROUND

Hydrocarbon facilities, such as oil and gas facilities for production, are large scale operations, often including hundreds or even thousands of sensors used to measure pressures, temperatures, flow rates, levels, compositions, and various other characteristics. The sensors included in such facilities may provide a wrong signal, and sensors may fail. Accordingly, process measurements are inevitably corrupted by errors during the measurement, processing and transmission of the measured signal. These errors can take a variety of forms. These can include duplicate values, null/unknown values, values that exceed data range limits, outlier values, propagation of suspect or poor quality data, and time ranges of missing data due to field telemetry failures. Other errors may exist as well.

The quality of the oil field data significantly affects the oil production performance and the profit gained from using various data and/or analysis systems for process monitoring, online optimization, and control. Unfortunately, based on the various errors that can occur, oil field data often contain errors and missing values that invalidate the information used for production optimization.

To improve the accuracy of process data, fault detection techniques have been developed to determine when and how such sensors fail. For example, data driven models including principal component analysis (PCA) and its extension, dynamic PCA (DPCA), which includes time lagged variables to represent dynamic processes, have been developed. However, there are several drawbacks to PCA and DPCA, including the inability to handle any missing or corrupted data in the training data set used to build the model. As with most data driven modelling techniques, a model built using DPCA will only be as good as the data on which the model is built. Therefore, traditionally, DPCA models are built using "known good" or generally fault-free training data sets. However, this is not always possible or ideal, because there may not be a fault-free data set available that adequately describes operation of the system and it is often quite time-consuming to manually clean a data set to prepare it for use in modeling.

In some cases, another analysis and data processing technique called Principal Component Pursuit (PCP) has been used, which performs a convex minimization approach to analyze data sets. PCP is discussed further in Zhou Z., Li X., Wright J., Candes E., & Ma Y. (2010) "Stable Principal Component Pursuit," *International Symposium on Information Theory*, which is incorporated herein by reference in its entirety. Such PCP analysis has, in the past, been used in image processing, and in isolated circumstances, as an alternative to PCA for purposes of process fault detection. However, to use PCP for fault detection on real-time data can be computationally complex, and often PCP is applied based on an assumption of fault-free data in a training set. Furthermore, PCP is not a dynamic method and therefore does not consider time dependencies in data.

Accordingly, the existing approaches do not provide a robust modeling approach that accounts for imperfect training data, particularly for use in real-time processing of large-scale, time-sequence data sets.

For the above and other reasons, improvements in detection and addressing faults in industrial processes are desirable.

SUMMARY

In accordance with the following disclosure, the above and other issues are addressed by the following:

In a first aspect, a computer-implemented method for detecting a fault in a data set from an industrial process are disclosed. One method includes forming a first data matrix at a data processing framework from training data, the training data from operation of an industrial process having at least two sensors, wherein the training data comprises time-series data. The method includes performing a principal component pursuit on the first data matrix to form an uncorrupted, unscaled matrix and a sparse matrix in the memory, and scaling the uncorrupted, unscaled matrix to form an uncorrupted scaled matrix. The method also includes performing a dynamic principal component analysis on the uncorrupted scaled matrix to form a dynamic principal component analysis model, and determining a squared prediction error from the dynamic principal component analysis model. Based on the squared prediction error, one or more faults are detected in a different data set from operation of the industrial process having the at least two sensors. At least one of (1) correcting the one or more faults in the different data set or (2) performing a repair operation on a sensor from among the at least two sensors is performed.

In a second aspect, a fault detection system useable to detect a fault in a data set from an industrial process is disclosed. The system includes a computing system including a processor and a memory communicatively connected to the processor. The computing system is configured to execute, based on instructions stored in the memory, a method that includes forming, in the memory, a first data matrix at a data processing framework from training data, the training data from operation of an industrial process having at least two sensors, wherein the training data comprises time-series data. The method further includes performing a principal component pursuit on the first data matrix to form an uncorrupted, unscaled matrix and a sparse matrix in the memory, and scaling the uncorrupted, unscaled matrix to form an uncorrupted scaled matrix. The method also includes performing a dynamic principal component analysis on the uncorrupted scaled matrix to form a dynamic principal component analysis model, and determining a squared prediction error from the dynamic principal component analysis model. The method also includes, based on the squared prediction error, detecting one or more faults in a different data set from operation of the industrial process having the at least two sensors. At least one of (1) correcting the one or more faults in the different data set or (2) performing a repair operation on a sensor from among the at least two sensors is performed.

In a third aspect, a fault detection system useable to detect a fault in a data set generated from at least two sensors monitoring a process within a hydrocarbon facility is disclosed. The fault detection system includes a computing system including a processor and a memory communicatively connected to the processor, the computing system configured to execute, based on instructions stored in the memory, a method that includes forming, in the memory, a first data matrix at a data processing framework from training data, the training data from at least two sensors associated with a process within a hydrocarbon facility, the training data comprising time-series data including any errors represented by a sparse data matrix, and performing a principal component pursuit on the first data matrix to form an uncorrupted, unscaled matrix and a sparse matrix in the memory, wherein performing the principal component pursuit includes tuning a parameter associated with the sparse matrix to balance a rate of fault detection against a rate of false alarming. The method also includes scaling the uncorrupted, unscaled matrix to form an uncorrupted scaled matrix, and performing a dynamic principal component analysis on the uncorrupted matrix to form a dynamic principal component analysis model. The method further includes determining a squared prediction error from the dynamic principal component analysis model, and based on the squared prediction error, detecting one or more faults in a different data set from the at least two sensors associated with the process within the hydrocarbon facility. At least one of (1) correcting the one or more faults in the different data set or (2) performing a repair operation on a sensor from among the at least two sensors is performed.

DETAILED DESCRIPTION

Definition

Figure 1:
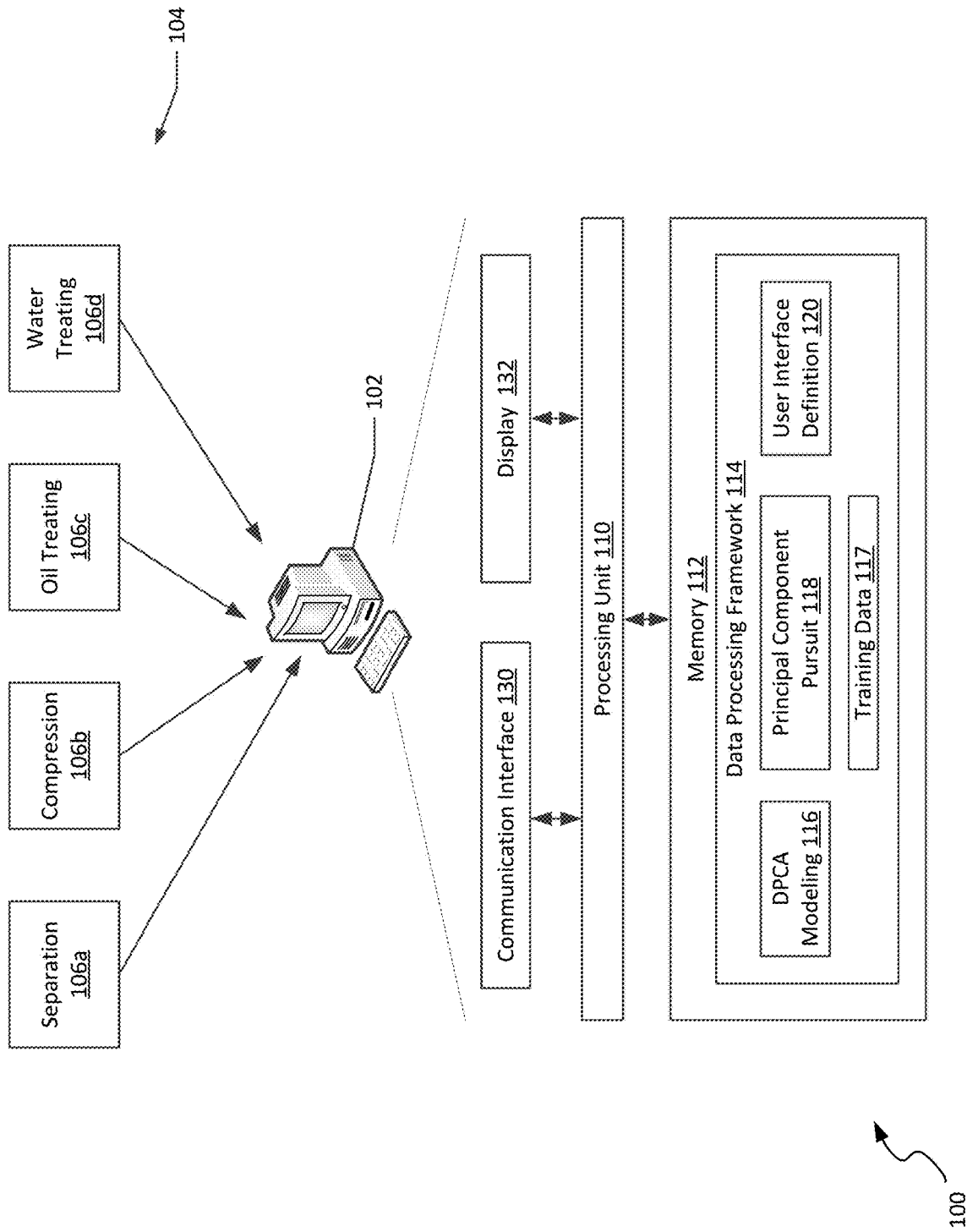
FIG. 1 illustrates a system in which the scalable data processing framework for dynamic data cleansing can be implemented in the context of an oil production facility, in an example embodiment.

For ease of understanding, the term "data set" will be used throughout this disclosure. A data set may include real-time data, historical data, or any combination thereof. The data set may be stored, for example, in a database or data historian. Alternatively, the data set may be streaming live. A data stream is one example of a data set. In one embodiment, the data set includes data from at least two sensors used in a process (e.g., an industrial process, a process in a hydrocarbon facility, etc.). A data set may include various data sets. A data set may include data from various sensors. As will be discussed herein, an embodiment provided herein may form a first data matrix at a data processing framework from training data (e.g., a first data set), the training data from operation of an industrial process having at least two sensors, where the training data comprises time-series data. Furthermore, the embodiment may perform a principal component pursuit on the first data matrix to form an uncorrupted, unscaled matrix and a sparse matrix in the memory; scale the uncorrupted, unscaled matrix to form an uncorrupted scaled matrix; perform a dynamic principal component analysis on the uncorrupted scaled matrix to form a dynamic principal component analysis model; and determine a squared prediction error (SPE) from the dynamic principal component analysis model. Furthermore, the embodiment may, based on the squared prediction error (SPE), detect one or more faults in a different data set (e.g., a second data set) from operation of the industrial process having the at least two sensors.

As briefly described above, embodiments of the present invention are directed to data cleansing systems and methods, for example to provide dynamic fault detection based on dynamic data. The systems and methods of the present disclosure provide for an ability to perform a robust dynamic principal components analysis (robust DPCA), in that the analysis allows for building a model that is tolerant of faults that may be present in training data. In example embodiments, a traditional DPCA analysis can be combined with a principal component pursuit (PCP) analysis that can be used to create a corrected training data set that will exclude for faulty data (e.g., outliers, frozen or missing values, bias, etc.). Referring generally to FIGS. 1-15, it is noted that the systems and methods of the present disclosure provide for an improved ability to detect errors relative to other DPCA models that are built based on similarly faulty data, which would typically cause DPCA analysis to quickly fail. Use of PCP to improve DPCA analysis is particularly advantageous in that it can be adapted to DPCA to adjust for acceptable noise, and to address possible balancing between false positive alerts and adequate detection levels. Secondly, PCP is capable of recovering the underlying matrices exactly, and therefore can be used to build a model that reliably represents the data. Furthermore, the fault detection embodiments discussed herein may be utilized to more accurately and more quickly detect faults in large data sets, for example, those data sets including 100s of variables. After a fault is detected using the embodiments described herein, a data cleansing method can be utilized to eliminate the fault, and after the fault is eliminated, the remaining cleaned data can be used for further analysis and/or storage. Embodiments of data cleansing methods that may be used include, but are not limited to, those found in US Patent Publication No. 2014/0108359 (T-9157), which is incorporated herein by reference in its entirety.

In accordance with the present disclosure, the fault detection and repair features described herein can be applied to a number of scenarios. For example, in the case of data received from sensors associated with an industrial process, in some cases, correcting the one or more faults in a data set can be performed. In other cases, performing a repair operation on a sensor from among the at least two sensors can be performed. The repair operation can include, for example, fixing a sensor or its connection, or replacement of the sensor entirely in the event of severe malfunction, or both. In some embodiments, performing a repair operation on a sensor may include repairing software of the sensor, repairing hardware of the sensor, or both.

The language "performing at least one of (1) correcting the one or more faults in the different data set or (2) performing a repair operation on a sensor from among the at least two sensors" includes only (1) correcting the one or more faults in the different data set in some embodiments. The language "performing at least one of (1) correcting the one or more faults in the different data set or (2) performing a repair operation on a sensor from among the at least two sensors" includes only (2) performing a repair operation on a sensor from among the at least two sensors in some embodiments. The language "performing at least one of (1) correcting the one or more faults in the different data set or (2) performing a repair operation on a sensor from among the at least two sensors" includes both (1) correcting the one or more faults in the different data set and (2) performing a repair operation on a sensor from among the at least two sensors in some embodiments. Of course, other repair, intervention, or notification operations are possible as well, e.g., notifying a user of a need for repair, automatically shutting down all or a portion of an industrial process, etc.

Referring now to FIG. 1, an example system 100 is shown that is useable to implement a modeling system that is subsequently useable for fault detection in large-scale data applications, examples of which include industrial processes such as in the oil and gas industry. In particular, the example system 100 may integrate data of different types from an oil production facility, such as an oil field. As illustrated in the embodiment shown, a computing system 102 receives data from an oil production facility 104, which includes a plurality of subsystems, including, for example, a separation system 106a, a compression system 106b, an oil treating system 106c, a water treating system 106d, and other system 106e.

A hydrocarbon facility such as the oil production facility 104 can be any of a variety of types of oil production facilities, such as a land-based or offshore drilling system. In the embodiment shown, the subsystems of the oil production facility 104 each are associated with a variety of different types of data, and have sensors that can measure and report that data in a data set (e.g., in the form of one or more data streams). A sensor may be integral to a component (e.g., integral to a piece of equipment) or separate from the component (e.g., separate from the piece of equipment) depending on the circumstances. For example, the separation system 106a may include pressure and temperature sensors and associated sensors that test backpressure as well as inlet and outlet temperatures. In such a system, various errors may occur, for example sensor bias or other types of error conditions. The compression system 106b can include a pressure control for monitoring suction, as well as a variety of stage discharge temperature controllers and associated sensors. In addition, the oil treating system 106c, water treating system 106d, and other system 106e can each have a variety of types of sensors, including pressure and temperature sensors, which can be periodically sampled to generate a data set to be monitored by the computing system 102. It is recognized that the various systems 106a-e are intended as examples, and that various other systems could have sensors that are to be incorporated into data sets provided to the computing system 102 as well.

In the embodiment shown, the computing system 102 includes a processor 110 and a memory 112. The processor 110 can be any of a variety of types of programmable circuits capable of executing computer-readable instructions to perform various tasks, such as mathematical and communication tasks.

The memory 112 can include any of a variety of memory devices, such as using various types of computer-readable or computer storage media. A computer storage medium or computer-readable medium may be any medium that can contain or store the program for use by or in connection with the instruction execution system, apparatus, or device. In example embodiments, the computer storage medium is embodied as a computer storage device, such as a memory or mass storage device. In particular embodiments, the computer-readable media and computer storage media of the present disclosure comprise at least some tangible devices, and in specific embodiments such computer-readable media and computer storage media include exclusively non-transitory media.

In the embodiment shown, the memory 112 stores a data processing framework 114. The data processing framework 114 performs analysis of dynamic data, such as in a data set (e.g., from an oil production facility 104), for detecting and reconstructing faults in data. Of note, dynamic data may be real-time in some embodiments and may not be real-time in others. In the embodiment shown, the data processing framework 114 includes a DPCA modeling module 116, a principal component pursuit module 118, and a user interface definition module 120. However, in some embodiments, the data processing framework 114 may include less than or more than the modules 116, 118 and 120.

The DPCA modeling module 116 receives dynamic data, for example from a data set. The DPCA modeling module 116 requires training based on a training data set 117. The training data set 117 can be an isolated, pre-selected set of time-series data captured and stored that may be representative of operation of the selected sensor(s) within the system 100. An example of such analysis is discussed below in connection with FIGS. 2-3. Once trained, the DPCA model can be used for error detection in a subsequent data set(s).

The PCP module 118 detects errors in the received training data 117, and can, in the embodiment shown, create a low rank and a sparse matrix, which correspond to fault free data and detected faults in the training data, respectively. Example implementations integrating PCP regarding training data for a DPCA model are discussed below in connection with FIGS. 2-3.

The user interface definition module 120 presents to a user a configurable arrangement with which the scalable data framework can be configured to receive input streams and arrange analyses of those input streams, thereby allowing a user to define various analyses to be performed on the input data set. The user interface definition module 120 can also present to the user one or more alerts or alarms, for example based on faults in a different data set that are identified once the PCP module 118 and DPCA modeling module 116 are applied to create a robust DPCA model. For example, a squared prediction error derived from the DCPA model could be used to detect such faulty data in subsequently-monitored different data set. Depending on the embodiment, one or more of the items discussed herein may be presented to a user via a visualization, user interface, etc.

Optionally, in conjunction with the user interface definition component 120, a data reconstruction component (not shown) can be used to, in some cases, reconstruct faulty data according to a selected type of operation, e.g., based on the DPCA model. Details regarding such a user interface, and reconstruction of faulty data, are provided in U.S. patent application Ser. No. 14/937,701, filed on Nov. 10, 2015 and entitled "Data Processing Framework for Data Cleansing", published as U.S. Patent Publication No. 2016/0179599, the disclosure of which is hereby incorporated by reference in its entirety.

The computing system 102 can also include a communication interface 130 configured to receive a data set from the oil production facility 104, and transmit notifications as generated by the data processing framework 114, as well as a display 132 for presenting a user interface associated with the data processing framework 114. In various embodiments, the computing system 102 can include additional components, such as peripheral I/O devices, for example to allow a user to interact with the user interfaces generated by the data processing framework 114.

Figure 2:
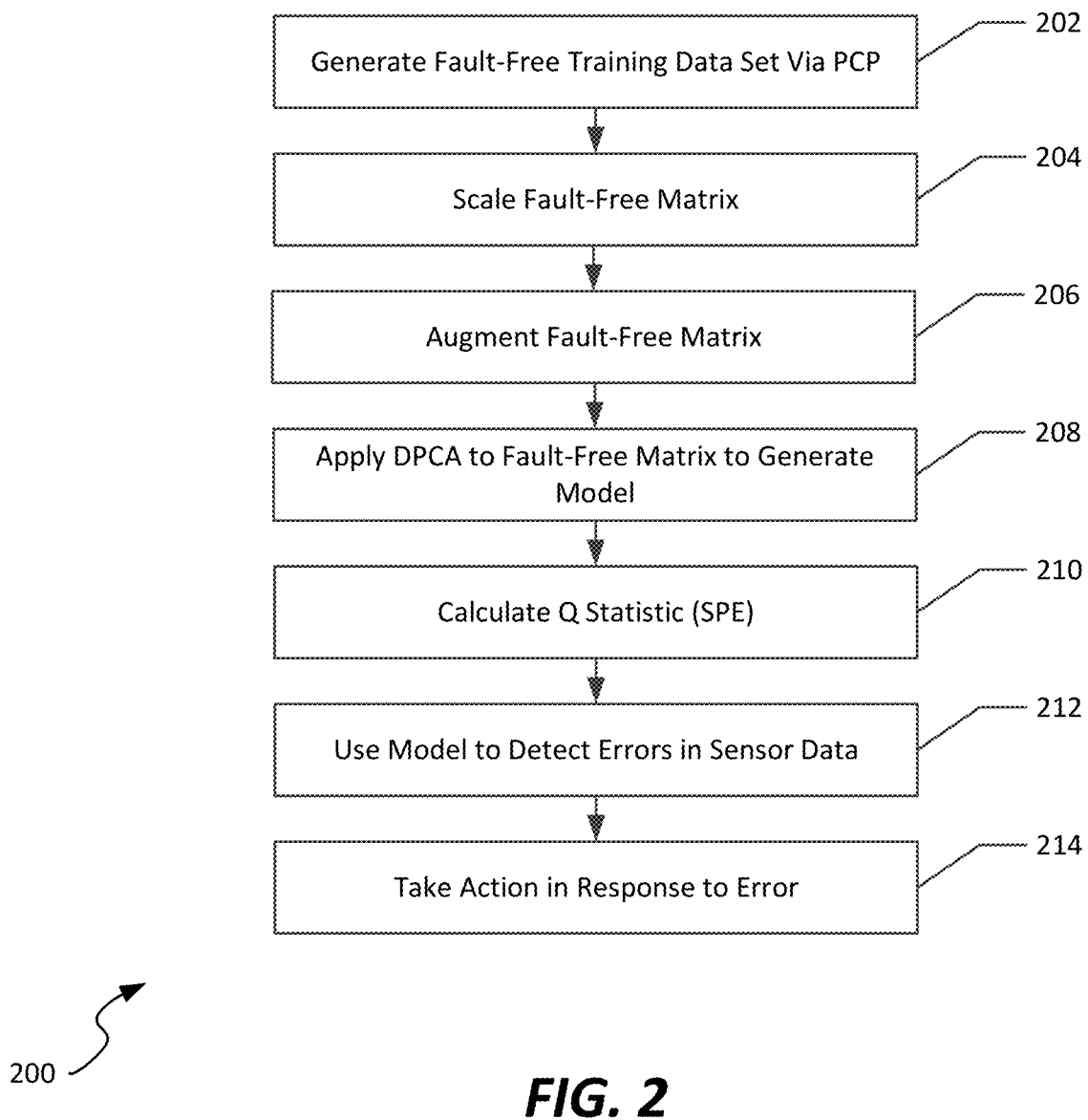
FIG. 2 illustrates a possible process for performing a robust dynamic principal component analysis on monitored data, according to an example embodiment.
Figure 3:
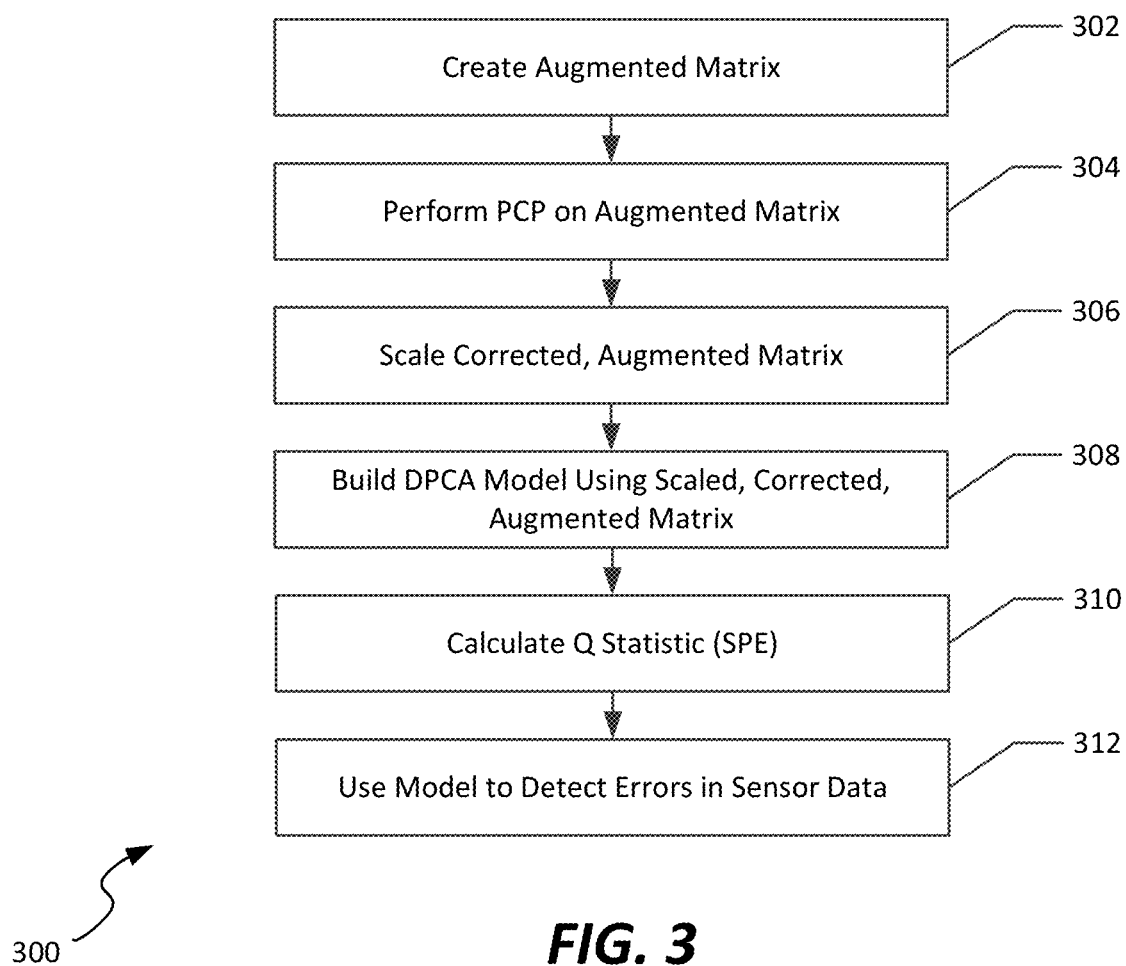
FIG. 3 illustrates a possible process for performing a robust dynamic principal component analysis on monitored data, according to a second example embodiment.

Referring now to FIGS. 2-3, processes for cleansing data in a data set are described, in conjunction with a combined PCP and DPCA analysis contemplated by the present disclosure. Generally, the processes of FIGS. 2-3 include similar operations, but have differing success rates based on the ordering of operations performed. In particular, FIG. 2 discloses a sequential process in which PCP is performed before DPCA, while FIG. 3 discloses a process in which PCP is performed in an "integrated" manner, after an augmented matrix is created for use in the DPCA analysis but before the DCPA calculations take place. In both cases, a matrix is created that does not include error data (outside of a particular noise threshold), and that matrix will have DPCA performed on it. The difference between the methods generally relates to whether augmenting (creating a time-lagged data matrix from the data set under consideration) is performed before or after PCP is applied. As explained in conjunction with the example applied data sets below, both approaches provide substantial improvement over standard DPCA analysis alone (which does not work well when trained with a data set including errors), while the "integrated" approach provides, in some cases, substantial additional accuracy relative to the "sequential" method.

Referring to FIG. 2, an example "sequential" process 200 is illustrated for cleansing data in a data set is illustrated. The data set used in process 200 can be, for example, a collection of data streams from a data source, such as from the oil production facility 104 of FIG. 1. However, the data set used in process 200 (and process 300) may be practically any data set as discussed herein.

In the embodiment shown, the process 200 generally includes selection of a training data set, which corresponds to a matrix M that is processed by PCP into a low-rank matrix $L_0$, a sparse matrix $S_0$ and a noise matrix $Z_0$ (step 202). The PCP methodology utilized herein, which is sometimes referred to as stable PCP, is discussed further in Zhou Z., Li X., Wright J., Candes E., & Ma Y. (2010) "Stable Principal Component Pursuit," *International Symposium on Information Theory*, which is incorporate herein by reference. As illustrated in process 200, a principal component pursuit process is applied to matrix M (step 202) to separate that matrix into those matrices. This is done by satisfying both:

$$\text{minimize } \|L\|_* + \lambda\|S\|_1$$
$$\text{subject to } \|M - L - S\|_F \leq \delta$$

In this context, the $\lambda$ symbol represents a trade-off between rank and sparsity. Accordingly, the $\lambda$ factor should be tuned to balance a need for error detection without increasing false positives above an acceptable level. Although in some embodiments, the factor could be set such that ($\lambda = \sqrt{\max\{n1,n2\}}$), such a set number may not be appropriate in alternative embodiments in which a convergence factor ($\delta$) is used that defines a level of appropriate noise, $Z_0$. Relatedly, the $\delta$ represents a convergence criteria that in effect sets a noise threshold. In particular, the $\delta$ factor defines a threshold for which two conditions are set: first, it must be greater than 0 (to allow for some noise factor to be incorporated), and second, the $Z_0$ (noise) term must fall under this value.

To solve the above constraints, an augmented Lagrangian multiplier (ALM) with alternating directions method can be applied. In particular, the ALM methodology can be applied as follows, in which an additional penalty term $$\left(\frac{\mu}{2}\|M - L - S\|_F^2\right)$$

is included:

$$(L, S, Y, \mu) \doteq \|L\|_* + \lambda\|S\|_1 + \langle Y, M - L - S\rangle + \frac{\mu}{2}\|M - L - S\|_F^2$$

In an alternative arrangement, an alternating directions method (ADM) can be used. In such a method, the L and S matrices can be minimized consecutively in iterations, as discussed in Lin Z., Chen L. W., & Ma Y. (2010), entitled "The augmented Lagrange multiplier method for exact recovery of a corrupted low-rank matrices", which is incorporated herein by reference in its entirety. Such a minimization technique can be expressed as follows:

$$L_{k+1} \in \text{argmin}_L L(L, S_k, Y_k, \mu_k)$$

$$S_{k+1} \in \text{argmin}_S L(L_{k+1}, S, Y_k, \mu_k)$$

$$Y_{k+1} = Y_k + \mu(M - L_{k+1} - S_{k+1})$$

which is performed iteratively until converged. As noted above, this minimization is extended by a noise term $Z_0$, which requires tuning of the $\delta$ factor accordingly, subject to the convergence criterion provided above (e.g., listed above).

With respect to the noise matrix, the convergence factor, delta, is a small value that represents the noise threshold. The criteria for convergence then becomes this delta multiplied by the Frobenius norm of the corrupted, scaled matrix. A noise matrix, Z, can be defined as a matrix that contains the small noisy perturbations in the data. It can be determined after convergence is achieved in the PCP process by subtracting the uncorrupted, scaled matrix and sparse matrix resulting from PCP from the corrupted matrix. Then, a new, noisy but uncorrupted matrix can be determined by adding the noise matrix, Z to the uncorrupted matrix. This result can then be used in the DPCA process. The use of this noisy uncorrupted matrix is expected to reduce the number of false alarms by adjusting for normal expected noise within any given process. The use of the noise matrix may be optional in some embodiments.

Once PCP is performed, the output matrices can be considered. In this case, the low-rank matrix $L_k$ can correspond to an unscaled version of the error-free data, and the sparse matrix $S_k$ can correspond to error data. Accordingly, the low-rank matrix $L_k$ can be scaled (step 204) to avoid scaling effects on the DPCA modeling. In the embodiments provided herein, the scaling is performed based on a zero mean and a unit variance.

From the scaled matrix (referred to herein as $L_0$), a model can be created (step 206) using DPCA from this now error-free, scaled matrix, $L_0$. The DPCA utilized herein is discussed in Ku W., Storer R. H., & Georgakis C. (1995) "Disturbance detection and isolation by dynamic principal component analysis," *Chem Intell Lab Syst*, 30 (1), 179-196, which is incorporated herein by reference in its entirety. Before performing the DPCA analysis, the method 200 includes generating an augmented matrix $L_{k,aug}$ using lagged variables from $L_k$ (step 206). The augmented matrix can be a time shifted matrix of the general structure below, which is used in a typical DPCA analysis:

$$X(l) = \begin{bmatrix} x_t^T & x_{t-1}^T & \cdots & x_{t-l}^T \\ x_{t-1}^T & x_{t-2}^T & \cdots & x_{t-l-1}^T \\ \vdots & \vdots & \ddots & \vdots \\ x_{t+l-n}^T & x_{t+l-n-1}^T & \cdots & x_{t-n}^T \end{bmatrix}$$

DPCA can be performed on the augmented matrix, $L_{k,aug}$ by calculating a covariance matrix, and performing singular value decomposition (SVD) on that covariance matrix (step 208). The set of variables that represent the most variance from the least variance can be separated.

Those variables representing the least variance (residuals) are then used to calculate the Q statistic (or the squared prediction error, SPE) for purposes of fault detection (step 210). The Q statistic, corresponds to the squared norm of the residual vector, and uses the residuals to determine how well a sample conforms to the model. The Q statistic, or SPE, is a preferred method of fault detection due to it being statistically independent with respect to time lags if enough data points are included in a training model. The control limits for the Q statistic can be determined, for example, using the method described in Nomikos P. & MacGregor J. F. (1995) "Multivariate SPC charts for monitoring batch processes. *Technometrics*, 37 (1), 41-59, which is incorporated herein by reference in its entirety. This method can be illustrated as:

$$\delta^2 = g^{SPE} \chi_\alpha^2(h^{SPE})$$

where $(1-\alpha) \times 100\%$ is the confidence level, level, $g^{SPE} = \theta_2/\theta_1$, $h^{SPE} = \theta_1^2/\theta_2$, $\theta_1 = \Sigma_{i=i+1}^n \lambda_i$, $\theta_2 = \Sigma_{i=i+1}^n \lambda_i^2$ and $\lambda_i$ is the $i^{th}$ eigenvalue of the covariance. Subsequently, the Q statistic, or squared prediction error (SPE), can be used to detect faults in a data stream (step 212) based on the model parameters.

Once faults are detected, an action can be taken in response to those faults (step 214). That action can take a variety of forms. In some cases, correcting the one or more faults in a data set can be performed. This can be accomplished, for example, using data reconstruction techniques such as those described in US Patent Publication No. 2014/0108359 (T-9157), which was previously incorporated by reference in its entirety. In other cases, performing a repair operation on a sensor from among the at least two sensors can be performed. The repair operation can include, for example, fixing a sensor or its connection, or replacement of the sensor entirely in the event of severe malfunction. Still other operations can be taken in response to faults (e.g., generation of notifications to users to take action, or initiating a repair operation). Such actions may particularly be applicable in the case of industrial processes which are not easily shut down to allow for repair of particular sensors and/or components.

Accordingly, the overall process 200 (not including step 214, which is based on the analysis described) can be summarized as follows:

---

Algorithm 1: Sequential Method (PCP, then DPCA)

---

1. Input M $\in \mathbb{R}_{n1 \times n2}$
2. Initialize
   $S_0 = Y_0 = 0$
   $\lambda \approx 10^{-2}$
   $\mu = (n1n2)/4||M||_1, k = 0$
3. while not converged, do (same as Algorithm 1,
   different convergence criteria)
   $L_{k+1} \leftarrow D_{1/\mu}(M - S_k + \mu^{-1}Y_k)$;
   $S_{k+1} \leftarrow S_{\lambda/\mu}(M - L_{k+1} + \mu^{-1}Y_k)$;
   $Y_{k+1} \leftarrow Y_k + \mu(M - L_{k+1} - S_{k+1})$;
4. end while
5. Output: $L_k$ and $S_k$, where the former is the
   uncorrupted, unscaled data and the latter is a
   sparse matrix
6. Scale $L_k$ to zero mean and unit variance
7. Generate augmented matrix, $L_{k,aug}$ with lagged
   variables from $L_k$
8. Do DPCA on $L_{k,aug}$
   (a) Compute $cov(L_{k,aug})$
   (b) Do SVD on $cov(L_{k,aug})$
   (c) Separate the set of variables that represent the
   most variance (the DPCA model) from the least
   variance (for the Q statistic)
9. Calculate Q statistic for fault detection

---

Referring to FIG. 3, an alternative "integrated" process 300 is shown in which an integrated PCP and DPCA analysis is performed to build a model based on fault-free data. In the alternative process 300 generally, both PCP and DPCA analyses are applied, but the PCP analysis is performed on the augmented matrix typically created for DPCA analysis, as is further outlined below.

In particular, in the alternative process 300, an augmented matrix is first formed (step 302) based on received training data. As above, the augmented matrix can be of the format seen below, in which a number of rows corresponds to a number of training samples and a number of columns corresponds to a number of time sequence steps desired for training:

$$X(l) = \begin{bmatrix} x_t^T & x_{t-1}^T & \cdots & x_{t-l}^T \\ x_{t-1}^T & x_{t-2}^T & \cdots & x_{t-l-1}^T \\ \vdots & \vdots & \ddots & \vdots \\ x_{t+l-n}^T & x_{t+l-n-1}^T & \cdots & x_{t-n}^T \end{bmatrix}$$

Using the augmented matrix, PCP is next performed (step 304) based on that augmented matrix. The PCP analysis performs conversion of an L and S matrix to output $L_k$, $S_k$, which are an uncorrupted, unscaled augmented matrix and a sparse matrix, respectively.

After the PCP analysis, the $L_k$ matrix is scaled (step 306), using a zero mean and unit variance. That scaled $L_k$ matrix is then used to perform the remaining portions of the DPCA process (step 308). Note that since the augmented matrix is generated before the step of performing PCP in process 300, the DPCA process for this method does not include determining the augmented matrix. In particular, and as above, a covariance of the matrix is determined, and SVD performed on that covariance matrix. A Q statistic is also calculated (step 310), which is useable to detect errors in subsequent data. Accordingly, after the statistic is calculated, the DPCA model can likewise be used on a different data set to detect subsequently-received faulty data (step 312).

Accordingly, the overall process 300 can be summarized as follows:

---

Algorithm 2: Integrated Method (PCP on augmented matrix)

1. Input M $\in \mathbb{R}_{n1 \times n2}$
2. Generate augmented matrix, $M_{aug}$ with lagged variables from M
3. Initialize
    $S_0 = Y_0 = 0$
    $\lambda \approx 10^{-2}$
    $\mu = (n1n2)/4||M||_1, k = 0$
4. while not converged do (same as Algorithm 1, different convergence criteria)
    $L_{k+1} \leftarrow D_{1/\mu}(M_{aug} - S_k + \mu^{-1}Y_k);$
    $S_{k+1} \leftarrow S_{\lambda/\mu}(M_{aug} - L_{k+1} + \mu^{-1}Y_k);$
    $Y_{k+1} \leftarrow Y_k + \mu(M_{aug} - L_{k+1} - S_{k+1});$
5. end while
6. Output: $L_k$ and $S_k$, where the former is the uncorrupted, unscaled augmented matrix and the latter is a sparse matrix
7. Scale $L_k$ to zero mean and unit variance
8. Do DPCA on $L_k$,
    (a) Compute cov($L_k$)
    (b) Do SVD on cov($L_k$)
    (c) Separate the set of variables that represent the most variance (the DPCA model) from the least variance (for the Q statistic)
9. Calculate Q statistic for fault detection

---

It is noted that the present disclosure relates generally to situations in which a predetermined set of training data is selected for creation of the DPCA model. Accordingly, as operation of the system may change, periodically a user may elect to re-train the DPCA model using a different data set, to allow the DPCA model to track current operation of the process being monitored. In some embodiments, this robust DPCA, or RDPCA process, can be performed recursively to allow the DPCA model to update when a change is detected without having to repeat all of process 300. This would, ideally, eliminate or reduce the need for intensive recalculation of the DPCA matrices as described above.

Still further, it is noted that the process 300 can similarly incorporate an action step, such as the different actions to be taken as described above with respect to step 214 of FIG. 2.

Based on the above example embodiments, an example case study is presented in association with a field test on steam generator data, as an example application of the above modeling and fault detection system as used in the context of an industrial process. In particular, the methodologies described above are provided in various contexts to determine the accuracy of such processes relative to traditional DPCA analysis, when trained on the same faulty data. As seen herein, the modeling and fault detection system provides for improved fault detection, and therefore improved operation of the underlying process by being able to detect more accurately when errors in sensors used to monitor such processes may occur.

In an example case study, four different scenarios are considered. First, DPCA is carried out on normal data. This is the ideal scenario, since DPCA modelling has been successfully carried out on uncorrupted data. The second scenario corresponds to where DPCA is carried out on corrupted data. The third scenario is the sequential method outlined in connection with FIG. 2, where PCP is used to clean the data first, and this data is then used to build the DPCA model. The fourth scenario is the integrated method outlined above in connection with FIG. 3, where PCP is carried out on the augmented matrix to be used in DPCA.

In the example shown, the case study relates to a steam generator field test for data received from a plurality of sensors. As an initial matter, a matrix similarity is considered across these four scenarios. As seen in Table 1, below, the processes described above in connection with FIGS. 2-3 result in a substantially more similar matrix to the DPCA matrix based on uncorrupted data as compared to simply applying DPCA to faulty data:

TABLE 1

| Matrix Similarity Test | |
|---|---|
|  | Similarity |
| Normal DPCA vs Faulty DPCA | 0.4361 |
| Normal DPCA vs Sequential Method | 0.9981 |
| Normal DPCA vs Integrated Method | 0.9969 |

In a further analysis of the various methods, detection and false alarm rates were calculated using 4000 samples for training data, and the remaining 6000 as testing data. Fault types in this data set included outliers, missing values, frozen values and bias. The results are presented in Table 2, below.

TABLE 2

2000 samples for training data, 6000 for testing, λ = 0.02

|  | Detection of Fault | False Alarm |
|---|---|---|
| DPCA Trained with Normal data | 0.7688 | 0.0651 |
| DPCA Trained with Faulty Data | 0.0815 | 0.0028 |
| PCP then DPCA (Sequential), Faulty Data | 0.9104 | 0.6178 |
| Robust DPCA (Integrated with PCP), Faulty Data | 0.7746 | 0.2995 |

As seen in that table, a possible goal, namely, to meet or surpass the results of the normal DPCA results, can be achieved. As specifically seen in Table 2 (and in tables below) the text without bold and/or italics represents an acceptable value, while text in bold may be unacceptable, and text in bold and italics requires case-by-case analysis. The DPCA analysis shows approximately 77% successful detection, and a low 6.5% false alarm rate, where a successful detection rate corresponds to a number of correctly detected faults divided by a total number of detected faults, and a false alarm rate corresponds to a number of false alarms divided by the number of normal samples. However, DPCA analysis based on faulty data causes that analysis to be unable to detect most of the faults (hence "Detection of Fault" for DPCA trained with faulty data has bolded text). However, when the methods described herein are applied, such successful detection can be achieved. In particular, in the sequential method, a 91% detection is achieved, but has a drawback of a prohibitively high false alarm rate (hence, the bolded text for PCP then PDCA (Sequential) using faulty data as to false alarm rates). The integrated method of FIG. 3 results in a comparable fault detection rate to the normal DPCA, however, it also has a higher false alarm rate.

Accordingly, and as noted above, various components of the DPCA analysis can be adjusted in an attempt to improve this result, including among other features, the number of principal components used, and the convergence rate. However, one possible modification might be made to the λ factor, which assists by adjusting both detection and false alarm rates.

In Table 3, below, λ has been slightly changed, from 0.02 to 0.022. As seen in Table 3, the integrated method has substantially lower detection rates, but also has a far lower false alarm rate. The sequential method described in connection with FIG. 2 maintains a high detection rate and high false alarm rate. As such, even a slight change in λ causes a significant effect on results.

TABLE 3

Same as previous test, λ = 0.022 instead of 0.02

|  | Detection of Fault | False Alarm |
|---|---|---|
| DPCA Trained with Normal data | 0.7688 | 0.0651 |
| DPCA Trained with Faulty Data | 0.0815 | 0.0028 |
| PCP then DPCA (Sequential), Faulty Data | 0.8821 | 0.4217 |
| Robust DPCA (Integrated with PCP), Faulty Data | 0.5873 | 0.1021 |

Figure 4:
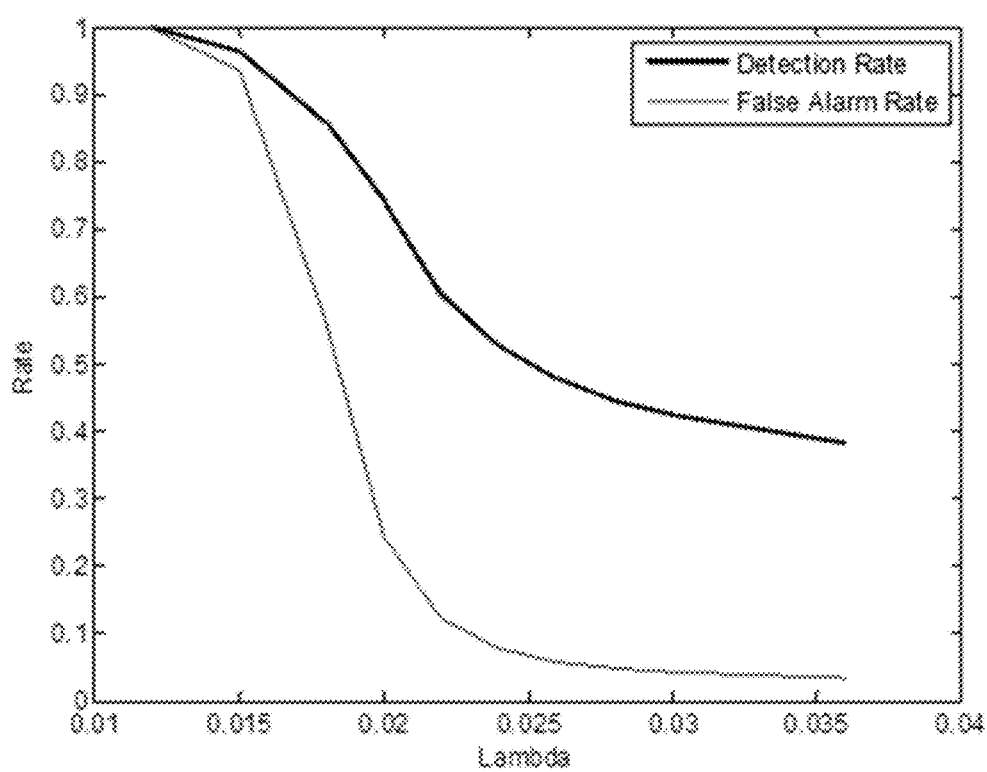
FIG. 4 is a graphical illustration of a correlation between a λ factor and both fault detection rate and false alarm rate.

As seen in FIG. 4, a graphical depiction 400 of the relationship between detection rate and false alarm rate in this example are provided. It is desirable to select a λ value that maintains a high detection rate, while achieving an acceptable false alarm rate. Both rates reduce, in this case, as the λ factor is increased.

Continuing the analysis of the effectiveness of the systems described herein, a relationship between a number of samples used in the training data set and the effectiveness of the related methodology are investigated. As seen in Table 4, a test is performed that uses 3000 data points in a training dataset, rather than 4000 training data points as above. In this example, while the detection rates remain high for the sequential and integrated processes of FIGS. 2-3, the false alarm rates remain high, indicating inadequate training of the DPCA model.

TABLE 4

Same as test 1, but with 3000 samples training data

|  | Detection of Fault | False Alarm |
|---|---|---|
| DPCA Trained with Normal data | 0.7994 | 0.0976 |
| DPCA Trained with Faulty Data | 0.0507 | 0.0025 |
| PCP then DPCA (Sequential), Faulty Data | 0.9961 | 0.9769 |
| Robust DPCA (Integrated with PCP), Faulty Data | 0.8361 | 0.6151 |

In view of the above, it can be seen that training of a standard DPCA model with faulty data results, in nearly all cases, in very poor detection rates. Accordingly, the robust DPCA processes presented herein, including both the "sequential" method of FIG. 2 and the "integrated" method of FIG. 3 both provide far improved detection rates.

Figure 5:
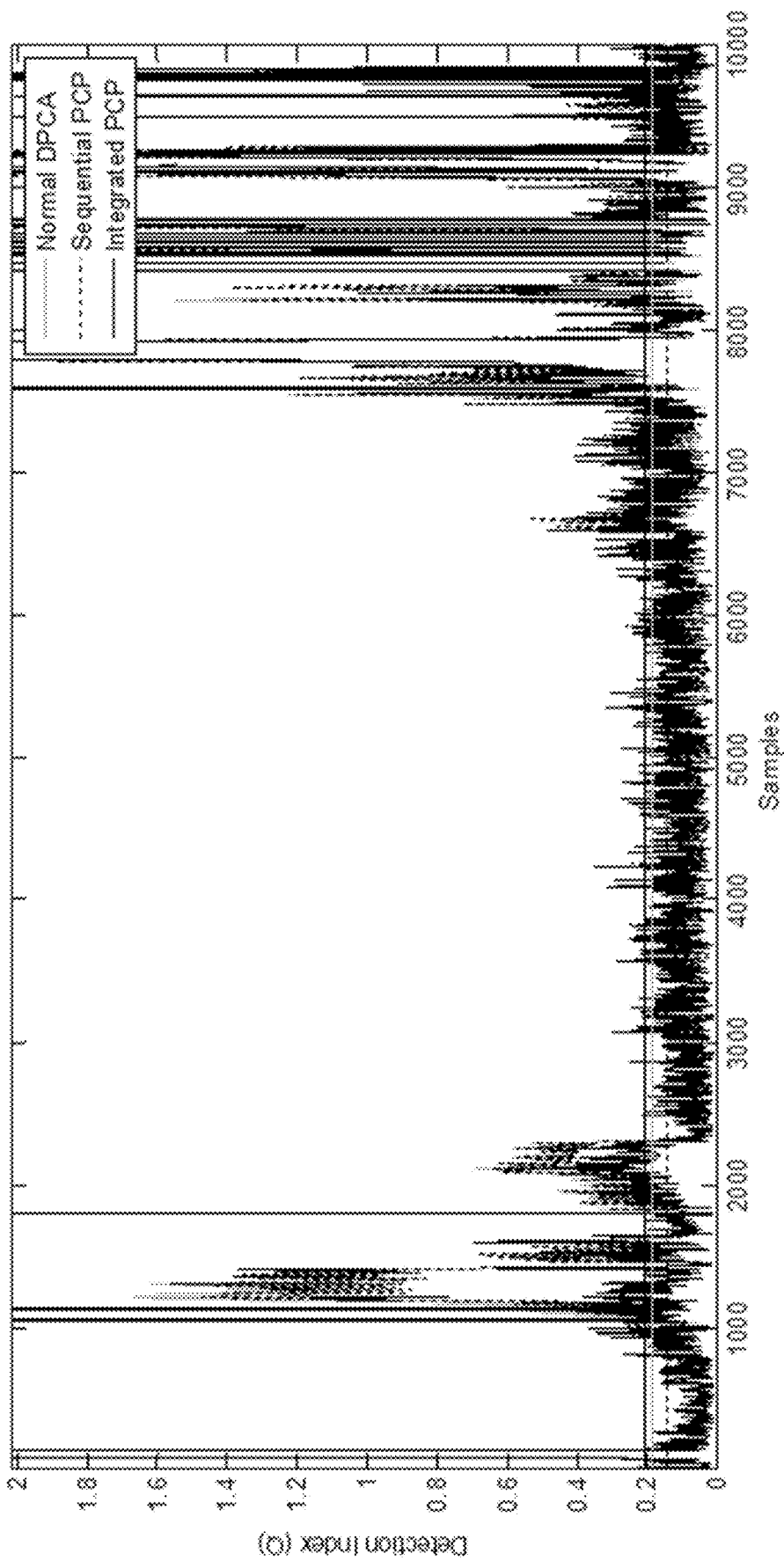
FIG. 5 is a graph illustrating accuracy of fault detection using traditional DPCA, sequential PCP and DPCA, and integrated PCP and DPCA analyses on an example faulty data set.

Referring to FIG. 5, a graph 500 is shown illustrating error detection using the various methods described herein relative to standard DPCA analysis. As seen in FIG. 5, the integrated method is able to detect some faults that the sequential method is not able to. Furthermore, though the sequential method results in high detection rates in all the tests, it also consistently results in high false alarm rates as compared to the integrated method. Furthermore, proper tuning and adequate training data are important to providing effective fault detection with either of the methods described herein. Of course, the integrated method requires an SVD calculation on a much larger matrix—the augmented (time-lagged) DPCA matrix. Accordingly, the integrated method will generally be more complex and compute-intensive for large data sets. But, since the building of the DPCA model is an offline activity, this is not a significant issue.

Referring now to FIGS. 6-9, test results are depicted from analysis of data from a set of water tanks used in conjunction with an oil cleaning process. In conjunction with the examples provided herein, a 2000 sample training data set is used. The data set is assessed both "as-is" and with outlier data added to that training data set to assess the effect of the methods described herein on compensating for such outliers.

Figure 6:
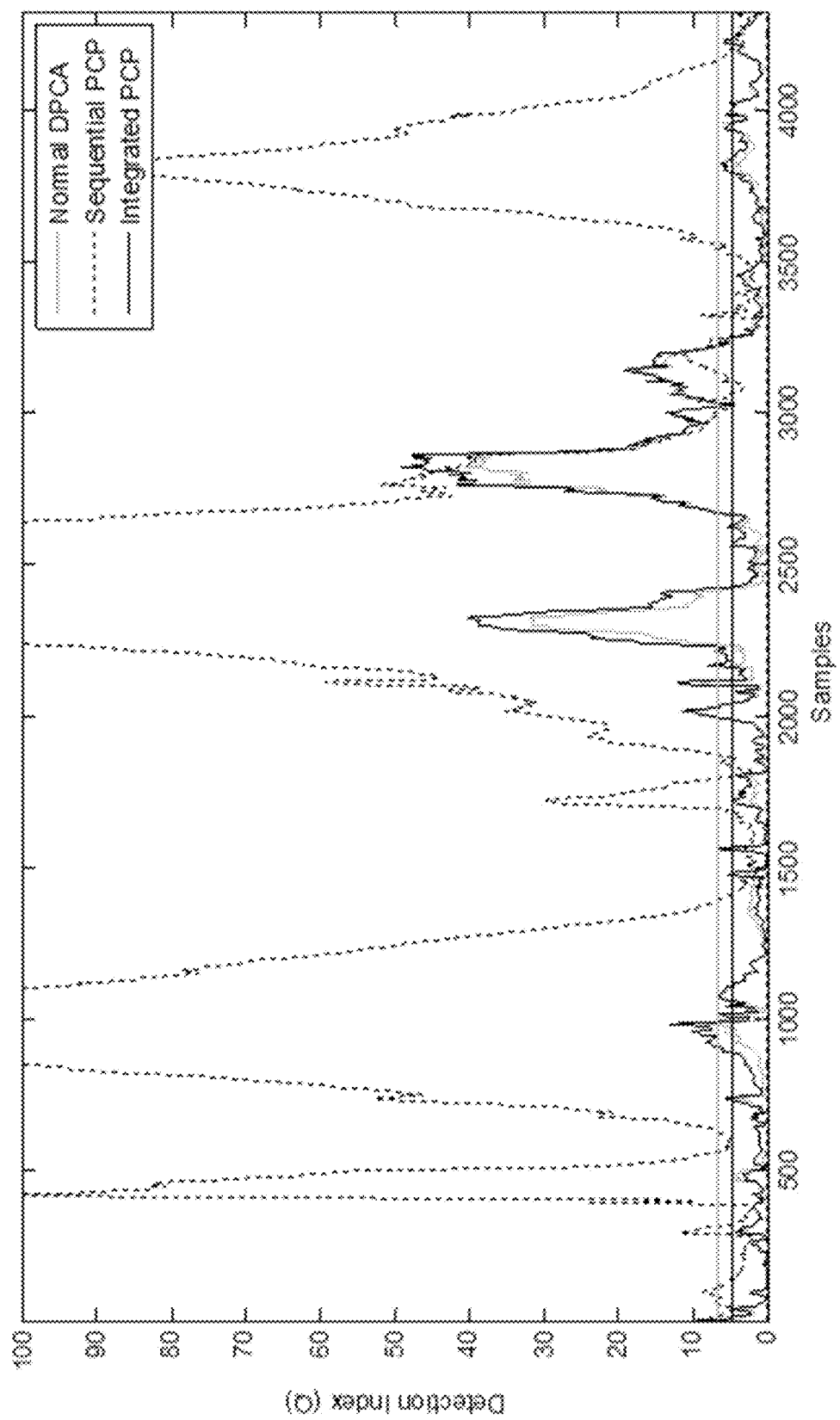
FIG. 6 is a graph illustrating use of traditional DPCA, sequential PCP and DPCA, and integrated PCP and DPCA analyses on an example data set of unknown quality.

FIG. 6 illustrates a graph 600 showing detection results for the data set using normal DPCA, and both the sequential and integrated methods. Although it is unknown whether there are faults within the data, it is seen that the integrated method detection results are very similar to the normal DPCA results and therefore the data is 'largely normal', and a low percentage of faults is acceptable. The sequential method in this case has a very high percent faulty result; this is likely reflective of the same problem of high false alarm rates described above.

Figure 7:
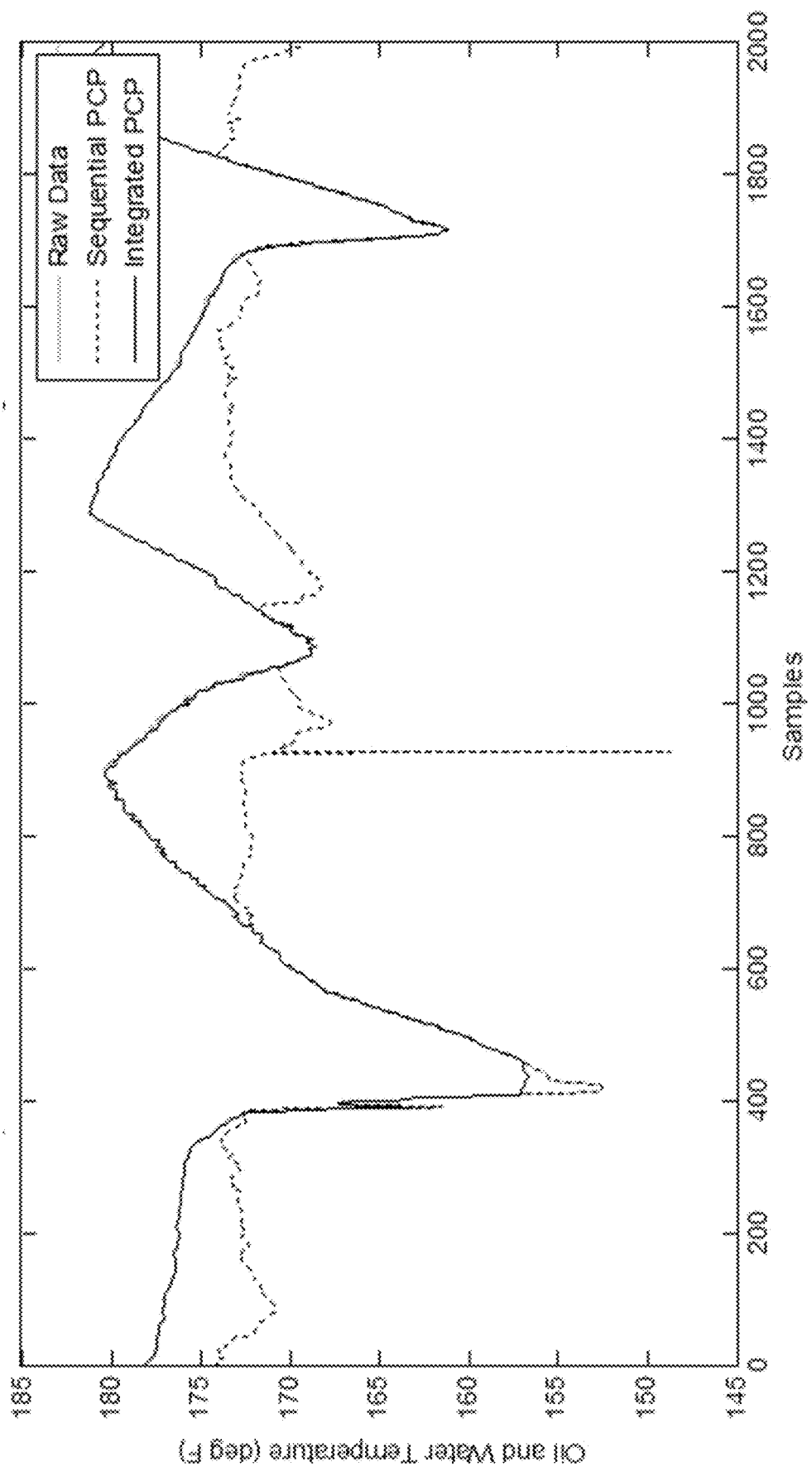
FIG. 7 is a graph illustrating a training data set with faults, as well as without faults using sequential and integrated PCP approaches.

FIG. 7 illustrates a graph 700 showing the training data set with fault data removed using the two PCP based models and compares those results to application of DPCA on the raw data. The integrated method is successful at recreating the raw data, while the sequential method is less successful.

Finally, the integrated method also results in relatively low detection, which is reasonable since the data is supposed to be representative of normal operation.

Figure 8:
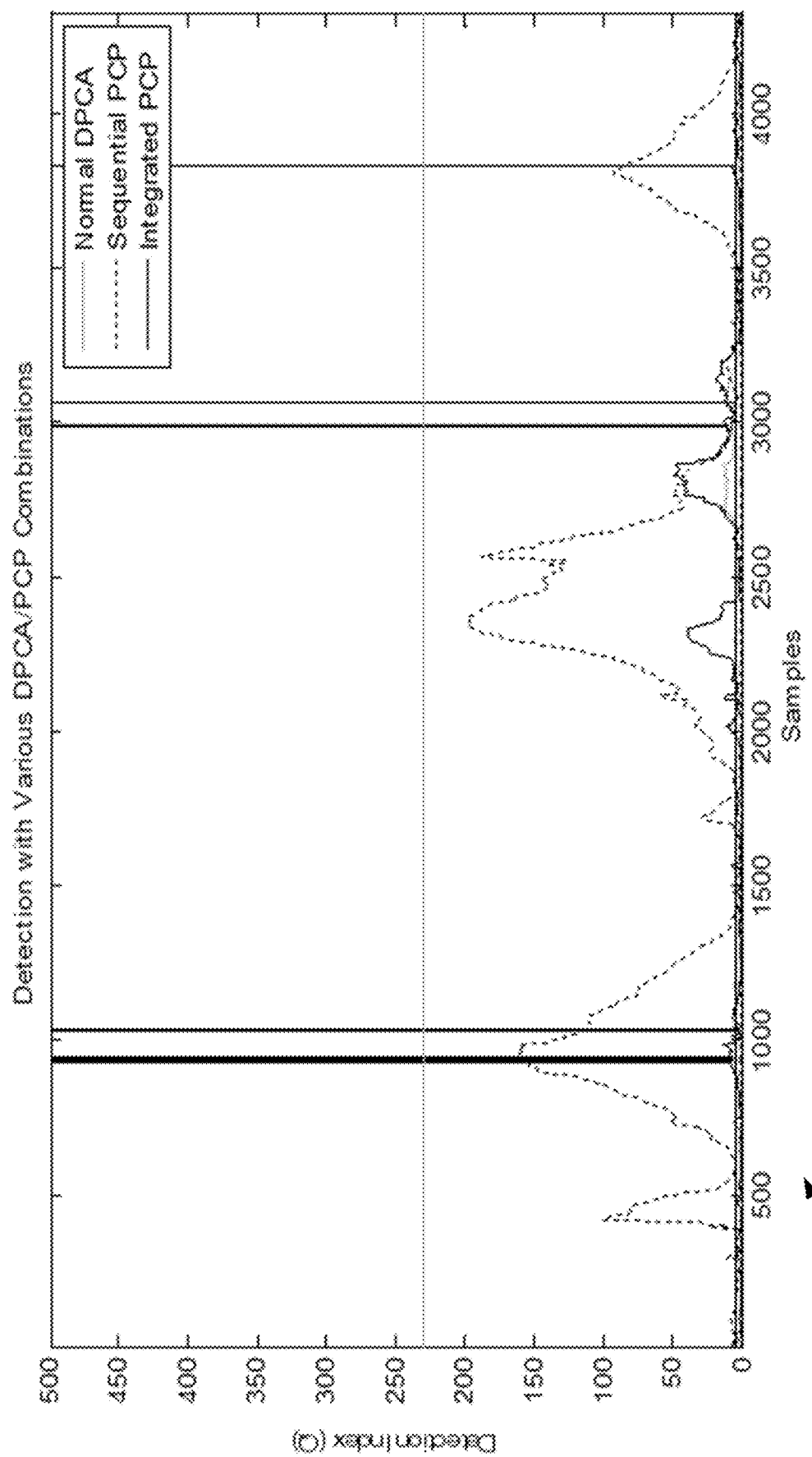
FIG. 8 is a graph illustrating operation of traditional DPCA, sequential and integrated PCP and DPCA approaches on a known-faulty training data set.
Figure 9:
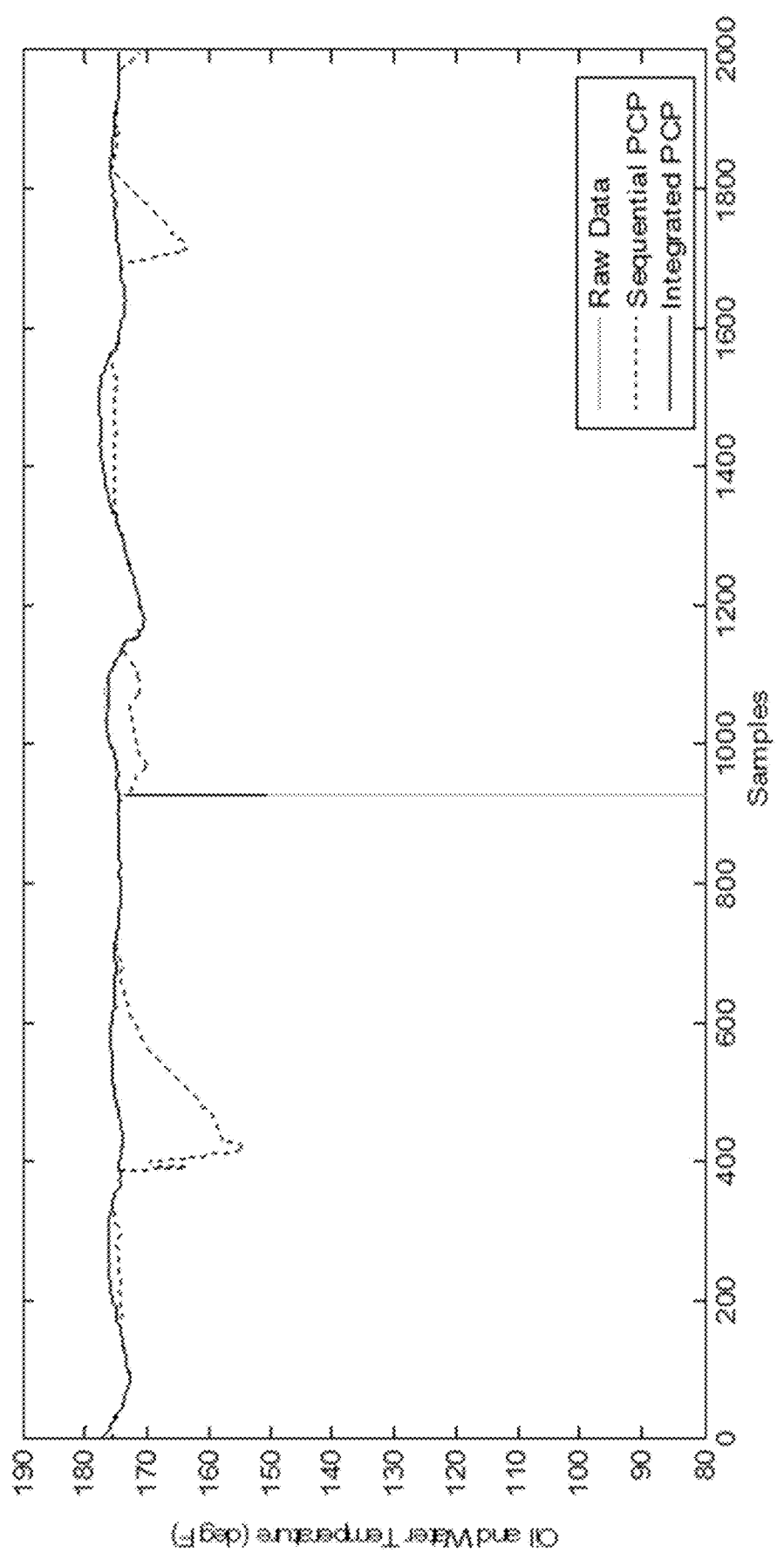
FIG. 9 illustrates the training data set with faults, used in FIG. 8, as well as without faults using sequential and integrated PCP approaches.

FIG. 8 illustrates a graph 800 showing operation of the various approaches described herein to data once obvious outliers and/or missing data points are introduced to the 2000 point training data set. In this example, the traditional DPCA method cannot be used, since it is no longer effective in the presence of such outliers (due to the effect on the error bound on the DPCA model). However, when considering both the sequential and integrated methods using PCP and DPCA, it can be seen that both methods provide drastic improvement. Although the sequential method still has the same problem of over-detection, both PCP methods successfully detect all 6 introduced outliers as anomalies. As seen in the graph 900 of FIG. 9, the training data set with faults removed shows that the integrated PCP method is able to completely eliminate the outlier, while the sequential method is able to reduce its magnitude. The integrated method also is specifically successful, which is seen in that the previous low detection rate has only been affected slightly (from 10.07% to 10.32%), meaning that the new outliers have been detected, but nothing else has changed from the previous test (in which outliers were lacking entirely).

Referring now to FIGS. 10-15, a further concrete example of an application of the sequential and integrated methods is described, in connection with a Tennessee-Eastman process simulation. As seen in these figures, the integrated method is able to drastically reduce the faults introduced to the training data set, and is able to detect the introduced faults in the testing data with a low false alarm rate (12%, compared to 2% using completely fault free data). Accordingly, the robust DPCA can be successfully performed. The sequential method results in a high number of false alarms in this example, however, it is also able to eliminate the faults introduced to the training data set.

Figure 10:
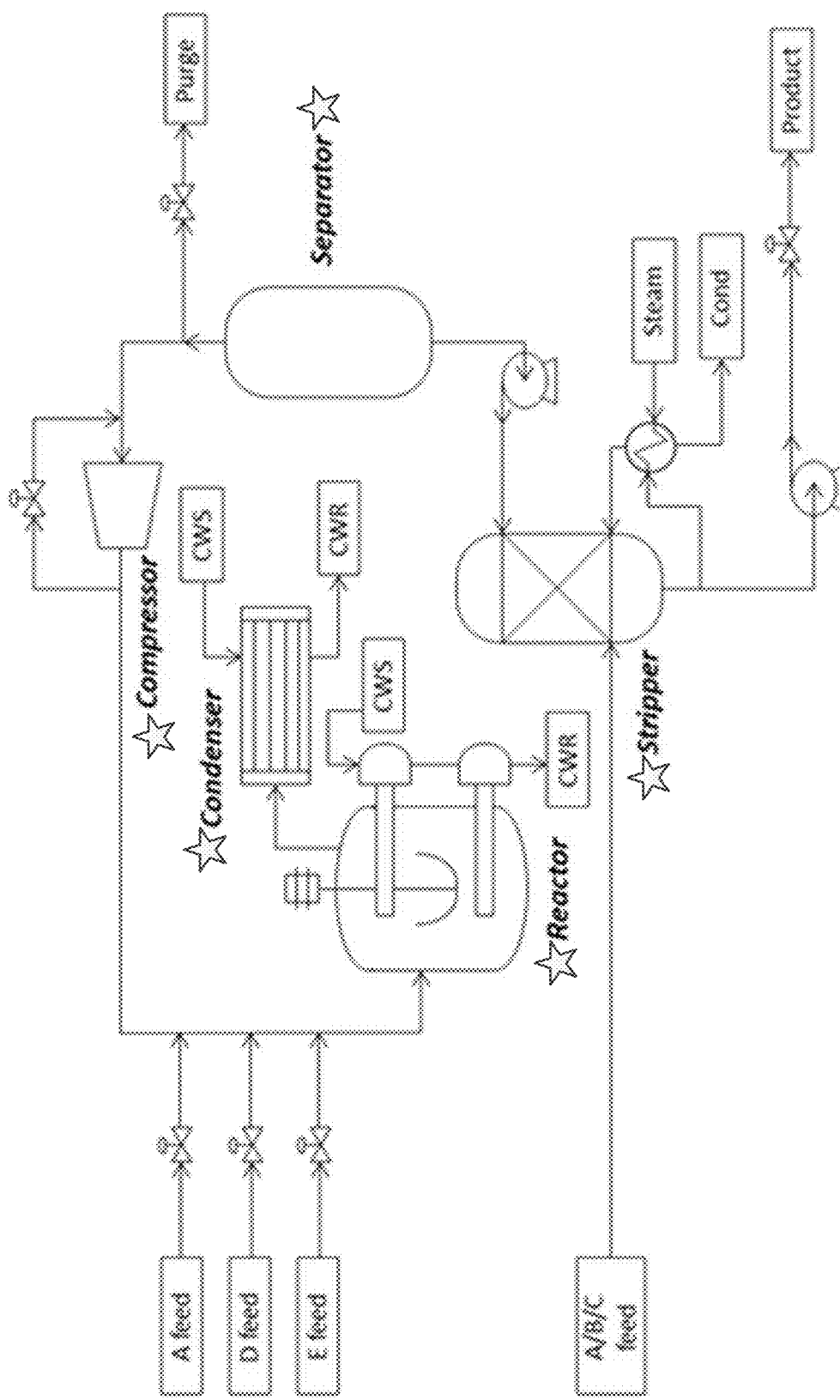
FIG. 10 is a schematic depiction of a Tennessee-Eastman process simulation representing an example industrial process on which the present analyses can be implemented.

FIG. 10 generally provides a schematic view of the model 1000 used in the Tennessee-Eastman process control simulation, which is a known process monitoring assessment model, provided herein for reference purposes only. It is noted that the methods and analyses described herein can be used with any of a variety of types of physical processes, and in particular industrial processes such as those in the oil and gas industry, as well.

Figure 11:
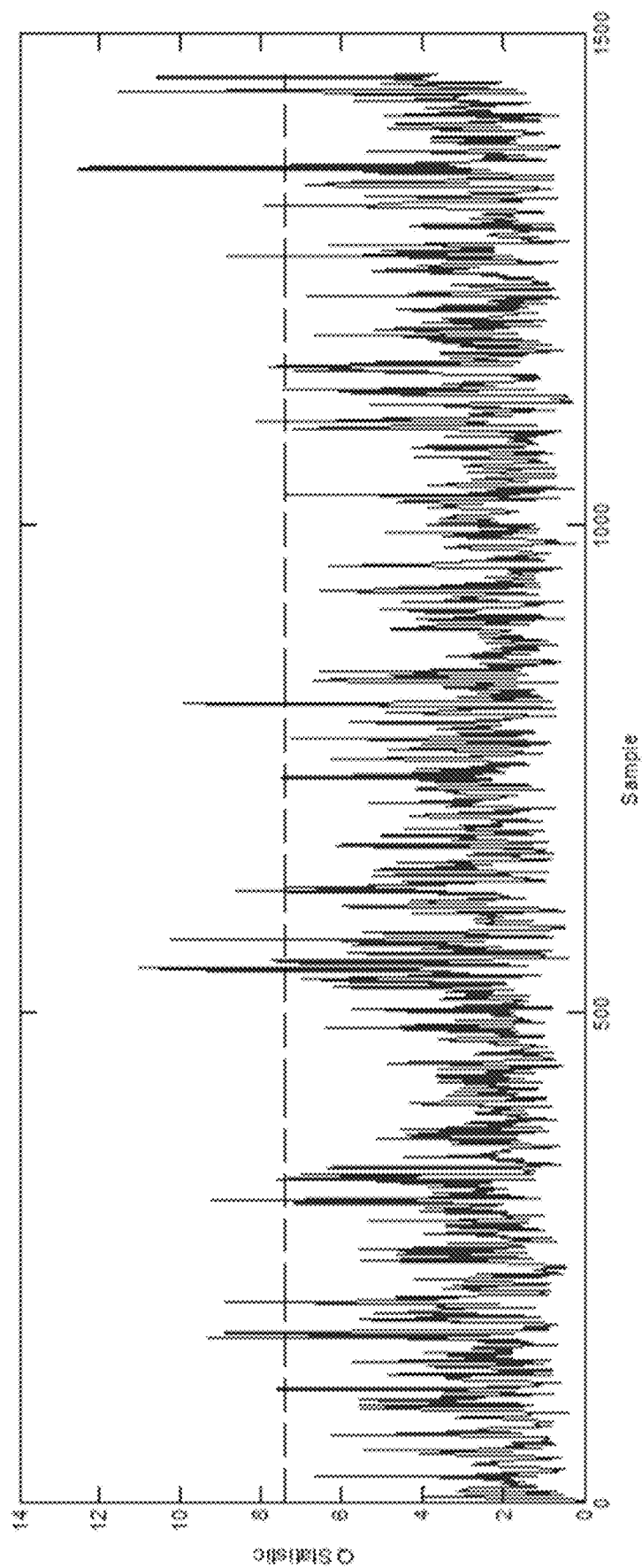
FIG. 11 is a graph of training data selected for a low alarm rate threshold.

As seen in FIG. 11, a graph 1100 of training data is selected such that a low false alarm rate threshold is achieved (in this case, 2.2%). Using that data, a fault free analysis is provided in which control limits are set with a low false alarm rate. In this case, a separator pressure, stripper pressure, reactor pressure, and component C in product, and recycle valve are monitored (as starred in FIG. 10). Furthermore, control limits are set to achieve an alarm rate of 2.2%

Figure 12:
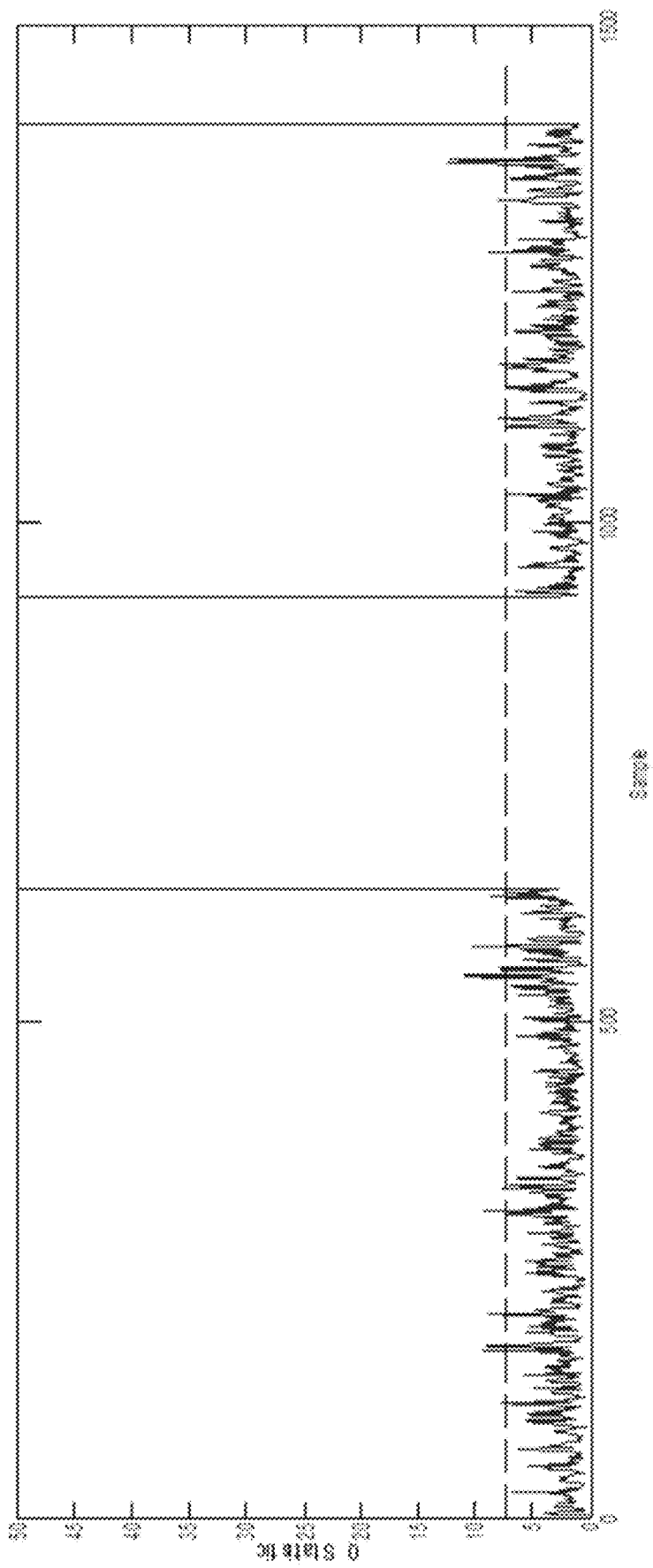
FIG. 12 is a graph illustrating use of traditional DPCA based on the training data of FIG. 11.
Figure 13:
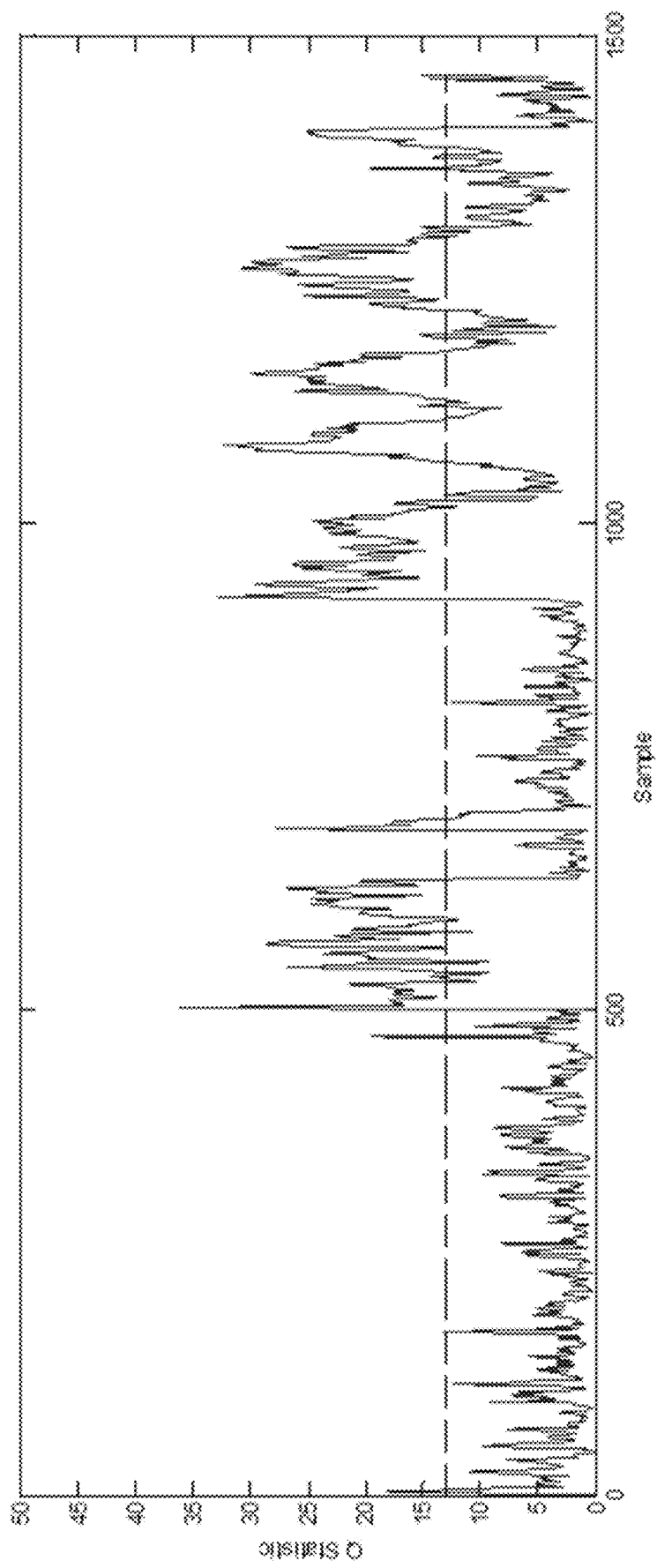
FIG. 13 is a graph illustrating use of traditional DPCA based on the training data of FIG. 11 with errors introduced.

In FIG. 12, a graph 1200 shows that errors introduced in the training data were detected, with the faults shown as the spikes. However, as seen in FIG. 13, graph 1300 is shown using a DPCA model trained on faulty training data. In this case, rather than the clean training data of FIG. 11, a DPCA analysis results on testing data in a detection rate of only 2.5%, and a false alarm rate of 69.89%. Accordingly, DPCA alone is not acceptable for use with faulty training data.

Figure 14:
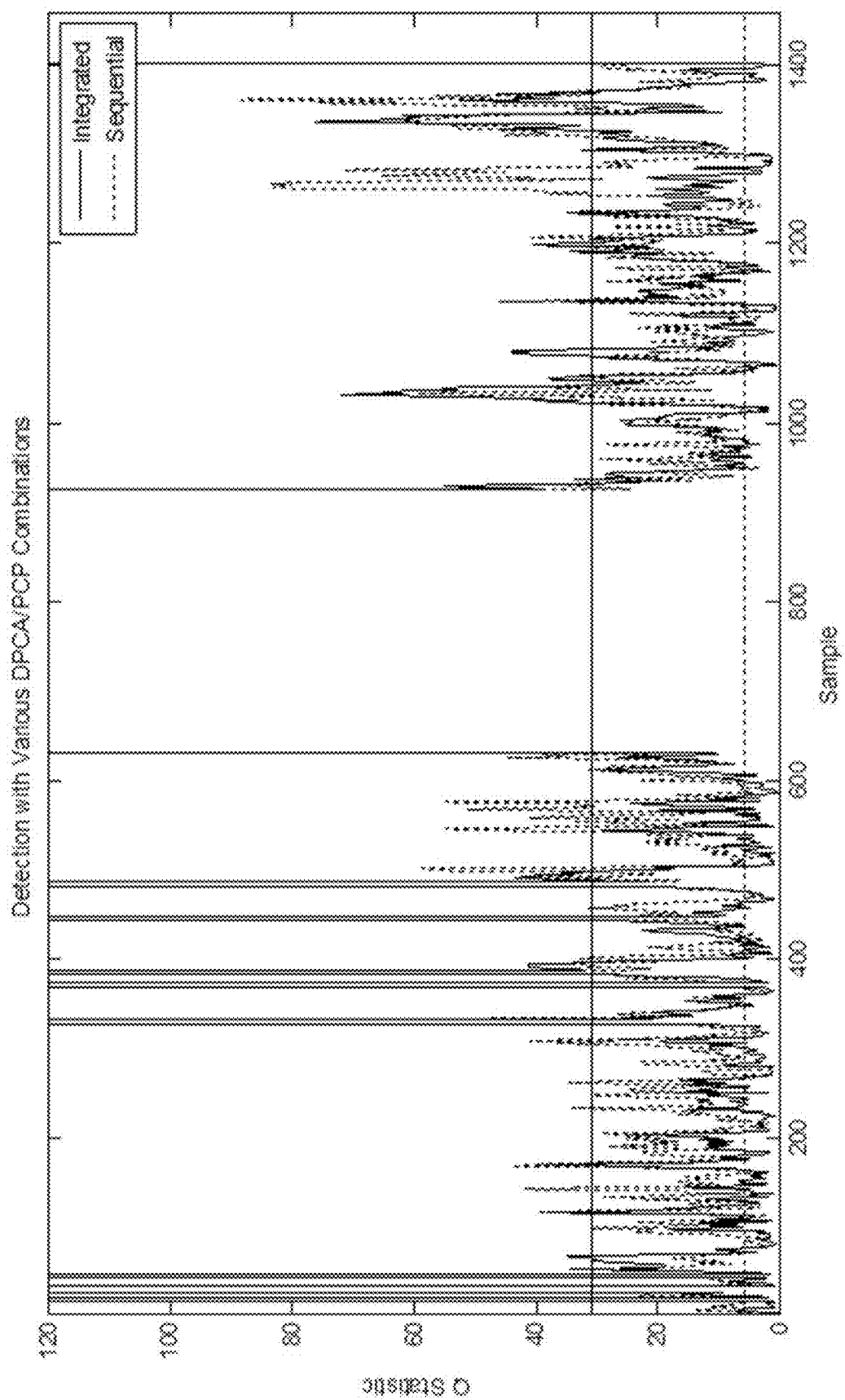
FIG. 14 is a graph illustrating use of sequential and integrated PCP and DPCA approaches using erroneous training data.
Figure 15:
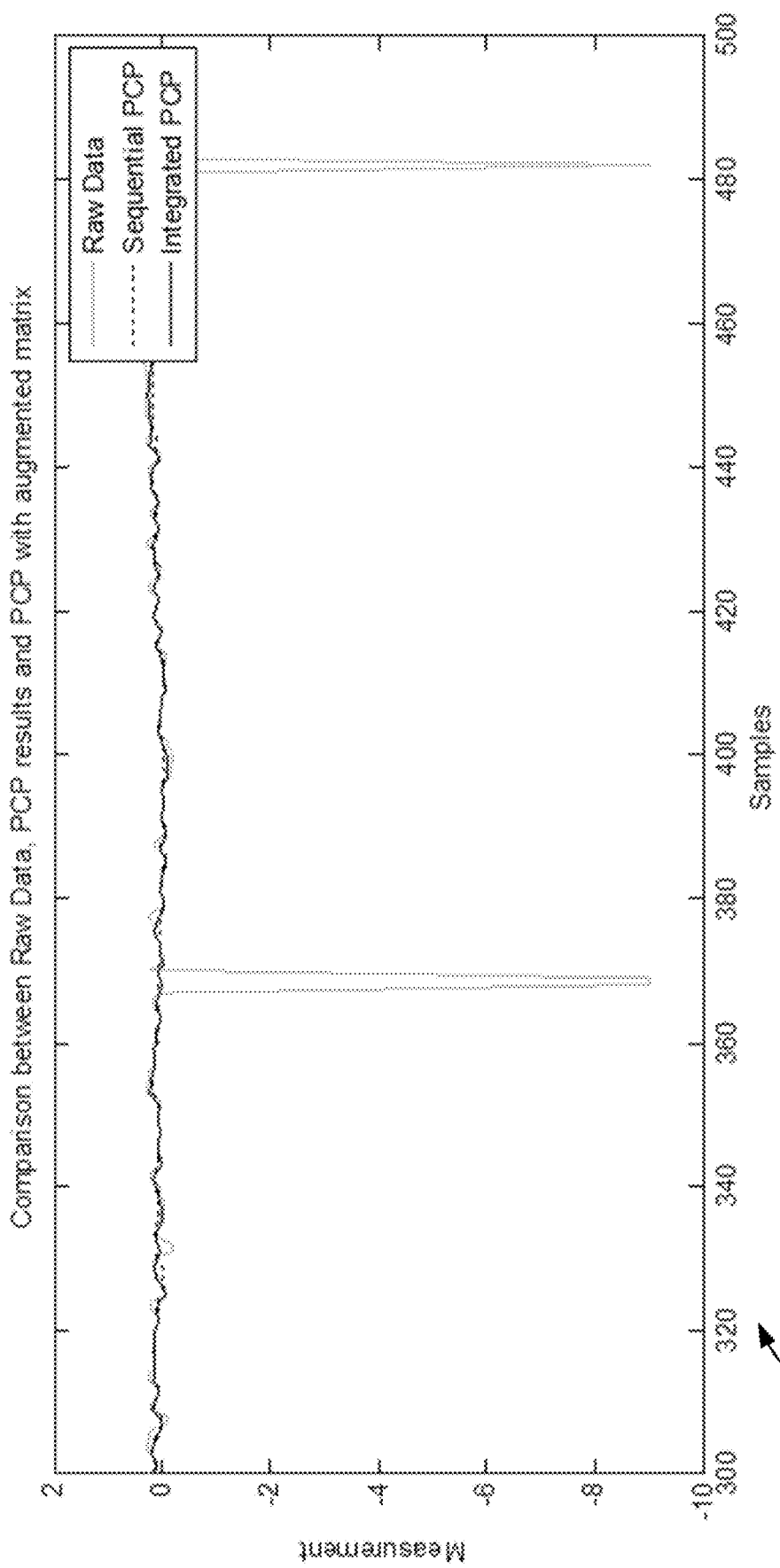
FIG. 15 is a graph illustrating data reconstruction using PCP within the sequential and integrated PCP and DPCA approaches applied in FIG. 14.

By way of contrast, in FIG. 14, both the sequential and integrated robust DPCA with PCP approaches are illustrated. In the graph 1400 of FIG. 14, all introduced faults are detected, but a false alarm rate varies widely across the approaches. In this example, the sequential method results in a 90.0% false alarm rate, and the integrated method results in a 12.2% false alarm rate. It is noted that, as shown in the graph 1500 of FIG. 15, all of the introduced false alarms are detected and removed using the PCP analysis in either context.

Referring generally to the systems and methods of FIGS. 1-15, it is noted that the methods and systems of the present disclosure provide a number of real world and computational advantages over existing systems. In particular, the methods and systems described herein allow for detection of faults with increased accuracy. The methods and systems in particular do so without requiring pre-cleaning or analysis of training data, which provides a significant advantage over existing technologies due to the time savings regarding process setup, and in particular, time savings regarding DPCA model building.

Referring in particular to computing systems embodying the methods and systems of the present disclosure, it is noted that various computing systems can be used to perform the processes disclosed herein. For example, embodiments of the disclosure may be practiced in various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems.

Embodiments of the present disclosure can be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Alternatively, one or more additional blocks may be added to any of the flowcharts and thus the order may change due to the one or more additional blocks.

While certain embodiments of the disclosure have been described, other embodiments may exist. Furthermore, although embodiments of the present disclosure have been described as being associated with data stored in memory and other storage mediums, data can also be stored on or read from other types of computer-readable media. Further, the disclosed methods' stages may be modified in any manner, including by reordering stages and/or inserting or deleting stages, without departing from the overall concept of the present disclosure.

The above specification, examples and data provide a complete description of the manufacture and use of the composition of the invention. Since many embodiments of the invention can be made without departing from the spirit and scope of the invention, the invention resides in the claims hereinafter appended. All references provided herein are incorporated herein by reference in their entirety.

The invention claimed is:

1. A computer-implemented method for monitoring an industrial process, the method comprising:
    forming, in memory of a computing system, a first data matrix at a data processing framework from training data, the training data from operation of the industrial process having at least two sensors, wherein the training data comprises time-series data;
    performing a principal component pursuit on the first data matrix to form at least an uncorrupted, unscaled matrix and a sparse matrix in the memory, wherein the uncorrupted, unscaled matrix corresponds to error-free training data and wherein the sparse matrix corresponds to errors in the training data;
    scaling the uncorrupted, unscaled matrix to form an uncorrupted scaled matrix;
    performing a dynamic principal component analysis on the uncorrupted scaled matrix to form a dynamic principal component analysis model;
    determining a squared prediction error from the dynamic principal component analysis model and sample data from operation of the industrial process having the at least two sensors;
    based on the squared prediction error, detecting one or more faults in the sample data; and
    performing at least one of (1) correcting the one or more faults in the sample data or (2) performing a repair operation on a sensor from among the at least two sensors.

2. The computer-implemented method of claim 1, wherein the industrial process comprises a process occurring at a hydrocarbon facility.

3. The computer-implemented method of claim 1, wherein the first data matrix comprises an augmented matrix including time-lagged variables from an original matrix including the training data.

4. The computer-implemented method of claim 3, wherein the augmented matrix is only generated before the step of performing the principal component pursuit.

5. The computer-implemented method of claim 1, further comprising augmenting the uncorrupted matrix to form a two-dimensional matrix having a predetermined number of rows and a predetermined number of columns, the predetermined number of rows corresponding to a number of time-sequence samples included in the training data and the predetermined number of columns corresponding to a number of time-lagged variables being considered.

6. The computer-implemented method of claim 1, wherein the principal component pursuit includes a parameter defining a threshold for noise from the first data matrix.

7. The computer-implemented method of claim 6, further comprising generating a noise matrix based on the threshold for noise from the first data matrix.

8. The computer-implemented method of claim 7, further comprising adding the noise matrix to the uncorrupted, unscaled matrix and using the noisy, uncorrupted, unscaled matrix for performing the dynamic principal component analysis.

9. The computer-implemented method of claim 6, wherein the parameter is greater than zero.

10. The computer-implemented method of claim 1, further comprising generating an alert indicating the existence of the one or more faults.

11. The computer-implemented method of claim 1, further comprising tuning a parameter associated with the sparse matrix to balance a rate of fault detection against a rate of false alarming.

12. A fault detection system useable to monitor an industrial process, the fault detection system comprising:
    a computing system including a processor and a memory communicatively connected to the processor, the computing system configured to execute, based on instructions stored in the memory, a method, the method comprising:
        forming, in the memory, a first data matrix at a data processing framework from training data, the training data from operation of the industrial process having at least two sensors, wherein the training data comprises time-series data;
        performing a principal component pursuit on the first data matrix to form at least an uncorrupted, unscaled matrix and a sparse matrix in the memory, wherein the uncorrupted, unscaled matrix corresponds to error-free training data and the sparse matrix corresponds to errors in the training data;
        scaling the uncorrupted, unscaled matrix to form an uncorrupted scaled matrix;
        performing a dynamic principal component analysis on the uncorrupted scaled matrix to form a dynamic principal component analysis model;
        determining a squared prediction error from the dynamic principal component analysis model and sample data from operation of the industrial process having the at least two sensors;
        based on the squared prediction error, detecting one or more faults in the sample data; and
        performing at least one of (1) correcting the one or more faults in the sample data or (2) initiating a repair operation on a sensor from among the at least two sensors.

13. The system of claim 12, wherein the first data matrix comprises an augmented matrix including time-lagged variables from an original matrix including the training data.

14. The system of claim 13, wherein the augmented matrix is only generated before the step of performing the principal component pursuit.

15. The system of claim 12, wherein the principal component pursuit includes a parameter defining a threshold for noise from the first data matrix.

16. The system of claim 15, further comprising generating a noise matrix based on the threshold for noise from the first data matrix.

17. The system of claim 16, further comprising adding the noise matrix to the uncorrupted, unscaled matrix and using the noisy, uncorrupted, unscaled matrix for performing the dynamic principal component analysis.

18. The system of claim 15, wherein the parameter is greater than zero.

19. The system of claim 12, further comprising a display configured to display an alert to the user based on detection of the one or more faults.

20. The system of claim 12, wherein the computing system comprises one or more computing devices.

21. The system of claim 12, further comprising generating an alert indicating the existence of the one or more faults to a user of the system.

22. A fault detection system useable to monitor a process within a hydrocarbon facility, the fault detection system comprising:
a computing system including a processor and a memory communicatively connected to the processor, the computing system configured to execute, based on instructions stored in the memory, a method, the method comprising:
forming, in the memory, a first data matrix at a data processing framework from training data, the training data from at least two sensors associated with the process within the hydrocarbon facility, the training data comprising time-series data including any errors represented by a sparse data matrix;
performing a principal component pursuit on the first data matrix to form at least an uncorrupted, unscaled matrix and a sparse matrix in the memory, wherein the uncorrupted, unsealed matrix corresponds to error-free training data, wherein the sparse matrix corresponds to errors in the training data, and wherein performing the principal component pursuit includes tuning a parameter associated with the sparse matrix to balance a rate of fault detection against a rate of false alarming;
scaling the uncorrupted, unsealed matrix to form an uncorrupted scaled matrix;
performing a dynamic principal component analysis on the uncorrupted matrix to form a dynamic principal component analysis model;
determining a squared prediction error from the dynamic principal component analysis model and sample data from operation of the process within the hydrocarbon facility having the at least two sensors;
based on the squared prediction error, detecting one or more faults in the sample data; and
performing at least one of (1) correcting the one or more faults in the sample data or (2) performing a repair operation on a sensor from among the at least two sensors.

23. The system of claim 22, wherein the first data matrix comprises an augmented matrix including time-lagged variables from an original matrix including the training data.

24. The system of claim 22, wherein the augmented matrix is only generated before the step of performing the principal component pursuit.

* * * * *